United States Patent
Smith et al.

(10) Patent No.: US 7,482,386 B2
(45) Date of Patent: *Jan. 27, 2009

(54) HYDROTROPIC ADDITIVE TO WATER FOR DUST CONTROL

(75) Inventors: James W. Smith, Pantego, TX (US); Morris D. Key, Sherman, TX (US)

(73) Assignee: Envirospecialists, Inc., Fort Worth, TX (US)

( * ) Notice: Subject to any disclaimer, the term of this patent is extended or adjusted under 35 U.S.C. 154(b) by 76 days.

This patent is subject to a terminal disclaimer.

(21) Appl. No.: 10/744,938

(22) Filed: Dec. 22, 2003

(65) Prior Publication Data

US 2004/0192789 A1 Sep. 30, 2004

Related U.S. Application Data

(60) Provisional application No. 60/435,854, filed on Dec. 20, 2002.

(51) Int. Cl.
*B01D 47/00* (2006.01)
*C09K 3/22* (2006.01)

(52) U.S. Cl. .................. 516/204; 95/154; 95/155; 252/88.1; 252/88.2; 404/76; 510/421

(58) Field of Classification Search ............. 516/204; 95/154, 155; 252/88.1, 88.2; 404/76; 510/421
See application file for complete search history.

(56) References Cited

U.S. PATENT DOCUMENTS

| | | | |
|---|---|---|---|
| 3,648,434 A | 3/1972 | Gravis, III et al. | |
| 4,425,252 A | 1/1984 | Cargle et al. | |
| 4,561,905 A | 12/1985 | Kittle | |
| 4,737,305 A | 4/1988 | Dohner | |
| 4,944,892 A | 7/1990 | Leathers et al. | |
| 4,978,390 A | 12/1990 | Snedeker | |
| 5,223,165 A | 6/1993 | Winstanley et al. | |
| 5,331,022 A * | 7/1994 | Jochmann et al. | 523/136 |
| 5,746,837 A | 5/1998 | Beck et al. | |
| 5,785,813 A | 7/1998 | Smith et al. | |
| 6,372,842 B1 * | 4/2002 | Grisso et al. | 524/547 |
| 6,420,474 B1 | 7/2002 | Carey et al. | |
| 6,547,925 B1 | 4/2003 | Drew et al. | |
| 6,607,566 B1 * | 8/2003 | Coleman et al. | 44/301 |
| 2002/0065352 A1 | 5/2002 | Johnston et al. | |
| 2003/0203035 A1 * | 10/2003 | Hasan et al. | 424/489 |
| 2003/0224936 A1 * | 12/2003 | Kretzschmar | 504/100 |
| 2004/0192788 A1 | 9/2004 | Smith et al. | |

FOREIGN PATENT DOCUMENTS

| WO | WO 98/10026 | | 3/1998 |
|---|---|---|---|
| WO | WO0054568 A1 | * | 9/2000 |
| WO | WO0228179 A1 | * | 11/2002 |

OTHER PUBLICATIONS

The Dow Chemical Company, Product Information, DOW Surfactants, TERGITOL* TMN-10. Form 119-01934-0103 AMS.*
http://www.dow.com/surfactants/products/nonylph.htm.*
http:www.dow.com/surfactants/products/octyl.htm.*
The Dow Chemical Company, Material Safety Data Sheet for Product Name TERGITOL(TM) TMN-10.*

* cited by examiner

*Primary Examiner*—Timothy J Kugel
(74) *Attorney, Agent, or Firm*—Gardere Wynne Sewell, LLP

(57) ABSTRACT

Methods for controlling dust which include applying an effective amount of a composition including an alkylphenol ethoxylate (APE) surfactant, a polyglycol, an antifoaming agent, and water, to dust-producing material.

15 Claims, No Drawings

HYDROTROPIC ADDITIVE TO WATER FOR DUST CONTROL

CROSS REFERENCE TO RELATED APPLICATIONS

The present application claims priority to Provisional Application Ser. No. 60/435,854, filed Dec. 20, 2002, titled WETTING AGENT/MOISTURE CONTROL FORMULATION, which is hereby incorporated by reference

BACKGROUND OF THE INVENTION

As is known in the art of dust control, water alone, water with additives, or other liquids, usually oily liquids, must be applied to materials generating dust and to the dust itself in order to abate its deleterious effects. Dusts result from separating bulk materials into small particles by numerous processes. Dust control is generally required where construction and other materials processing operations are involved. Dusts are classified as nuisance or injurious. Injurious dusts cause property damage, damaging health effects, or both. Often, especially during hot, dry weather, bulk materials require large amounts of water applied often for effective dust control.

Bulk materials being processed are usually sprayed with water, oil, or oily emulsion to prevent dust generation. Using wet dust control methods, bulk materials and soils must be kept moist to the touch, except where blanketing technology or other specialized technology is used. Bulk materials are sometimes soaked in tanks of liquid prior to processing. When sprayed, dust palliatives are usually distributed by a truck, being sprayed on the material from a trailer pulled by a tractor rig. Costs of water, as well as the equipment and labor costs for distributing the water, are significant.

The present invention is useful to provide an economical method of controlling dust that reduces the amount of water required and the time required for each application. It is further desirable that such method decreases the frequency of applications both for reducing application cost, as well as preventing the rate of fugitive water loss by drift and evaporation that accompany the spraying process itself.

SUMMARY OF THE INVENTION

In accordance with the present invention, water used to control dust is mixed with a hydrotropic wetting agent having desired properties. The hydrotropic wetting agent enhances the activity of water for solids by lowering surface tension to promote surface-to-surface contact, to neutralize the electric double layer, to destroy protective colloids, to neutralize other charged particles, and to bind water to the materials, thus, significantly reducing the evaporation rate and, concomitantly, reducing the amount of water that must be applied and the energy and time used to prepare the material. Compositions of the present invention include and alkylphenol ethoxylate (APE) surfactant, such as, for example, Tergitol, and a polyglycol ether, such as for example, glycerin, propylene glycol, or other non-toxic polyglycols, and an antifoaming agent, such as for example, a polysiloxane polymer. These chemicals combined in the concentration ranges of the present invention produce wetting agent/hydrotropic formulations that when used as directed afford the benefits of the present invention.

DETAILED DESCRIPTION OF THE PRESENT INVENTION

Many factors affect the amount of water, method and time required for dust control, which is to a significant extent dependent on the rate of particle hydration (either separate or within the bulk matrix) and, once hydrated, the ability of particles to retain moisture and agglomerate. Without attempting an exhaustive treatment of this subject, it is sufficient to say that properties of the bulk material, i.e., type of material, particle-size-distribution, degree of hydration, and ambient weather conditions are the most important factors involved in water demand for dust control.

The present invention uses a combination of surfactants and hygroscopic compounds mixed with water to stabilize bulk materials to reduce their propensities to generate dust or agglomerate and settle airborne dust particles. Use of this- "hydrotrope", or hydrotropic wetting agent, allows for significantly less water to be used, less time required to wet the material, thus decreasing the frequency of application and saving costs for the water itself, labor, energy, and equipment costs required to apply it.

The present invention increases the sorption rates and retentive capacities of dusty materials and of materials that generate dust for water, thus decreasing the amount of water that must be applied, and the time required to achieve a given level of sorbed moisture. Thereby, less dust is generated and dust particles that are generated agglomerate faster and remain immobilized longer than when compared with treatment by water alone.

The hydrotropic wetting agent described by the present invention may include an APE surfactant combined with hygroscopic agents, usually glycerin or propylene glycol, and silicone defoamer/antifoam that induce rapid migration of the water/hydrotrope by virtue of the combined effect of lowered surface tension and hygroscopicity. Examples of alkyiphenol ethoxylates useful in the present invention include polyethoxylated nonyiphenols such as 2,6,8-trimethyl-4-nonyloxypolyethyleneoxyethanol, commercially available under the trade designation is Tergitol™ TMN-10. The surfactant concentration range is from about 10% to about 50% by volume in deionized water containing an anti-foaming agent, such as a polysiloxane polymer for example, in the range of about 0.50% to about 5% by volume. This formulation results in a hydrotropic concentrate that when added to water in a wide range of use dilutions provides the water for controlling dust. The resultant hydrotrope can be mixed with water at a ratio of between approximately 10-1000 ppm (0.001-0.1%) to give a product that can be applied directly to the roadbed, foundation, or soil or other material where dust control is desired. The water is applied in the same manner as is presently done in the art, with the difference that the material attains its required moisture levels much faster than otherwise by spreading faster and retaining its adsorbed and absorbed water longer, thereby remaining moist longer for a single application. Thus, water is applied less often. A field test indicates that approximately one-half as much water is required for dust control using this invention as compared with water alone.

A formulation of the present invention uses a non-toxic polyglycol or glycerin in addition to the Tergitol. The active components of this invention in its concentrated form are Tergitol™ TMN-10, in a concentration of 10-40% by volume, glycerin (or polyglycols), in a concentration of 10-40% by volume and, silicone anti-foaming agent in a concentration of about 3%. This material is mixed at a preferred ratio of between 10-1000 ppm with the water sprayed on the roadbed, foundation, or soil bed or other material in order to provide the benefits previously described.

A ratio in a useful range can be achieved, for example, by mixing the described formulation, as available from EnviroSpecialists as the product EWO, in the ratio of between 1.5 fl ozs and 10 gals of concentrate to 10,000 gals water, dependent on the type of material, temperature, and humidity. A typical hydrotrope—water formulation for most materials is 1.5 gals of EnviroSpecialists' Enviro DustSuppress™ per 3400 gallons of water in a tank truck.

Formulations of the present invention are preferably provided as a concentrates that can be conveniently transported to a site where dust suppression is desired, then diluted with large amounts of water, often by adding the concentrate to a water tank truck, to provide the described properties, which are far superior to those of water alone. Examples of such sites include construction of roads, general building construction site, quarries, feed lots, manufacturing plants that generate large amounts of dust such as a cement plant, and any other type of construction or heavy industry in which dust creation is a problem needing control.

What this invention utilizes is a combination of wetting agents, surfactants, antifoaming agents, and a hygroscopic agent carried in water to produce a hydrotropic agent that activates water and small particles by interfering with water-to-water hydrogen bonding and neutralizing electric double-layers, thus destroying protective colloids, and spreading over particles, increasing their ability to agglomerate.

Once the combination is added to a water source in the concentrations described above, it is applied in any suitable manner. Any of the techniques currently used to apply plain water for dust suppression are suitable. Thus, treated water can be applied using a water truck, which is especially suitable when suppressing dust at a road construction site, or where dust is raised by vehicles traveling dirt or gravel roads, such as often occurs at oil and gas drilling and production sites. This technique applies the treated water to a surface to minimize dust formation. Other techniques for applying treated water to a surface will be apparent to those skilled in the art, including application by any type of water sprayer or sprinkler device.

It is also possible to spray more finely atomized droplets into the air to remove dust that has already been produced. This requires a more finely atomized sprayed to generate a mist or fog that can agglomerate fine dust particles and cause them to settle. Proper use of a dust suppressant as described herein will limit airborne dust in the first place, but fine mist sprayers as known in the art can be used to remove airborne dust. Use of the additives described herein improves the ability of the water mist to remove dust, and in particular keeps it on the ground better after the dust has precipitated.

The additives described herein provide improved dust suppression over water alone by becoming agglomerating (i.e. sticky) to the dust particles more quickly than untreated water, and remaining longer after application. This means less water is required to perform equivalent dust suppression that is currently available, or that enhanced suppression can be achieved with almost no additional cost or complexity over current techniques by simply adding a relatively small amount of the formulation described herein.

While the invention has been particularly shown and described with reference to the above-described example, it will be understood by those skilled in the art that various changes in form and detail may be made therein without departing from the spirit and scope of the invention.

What is claimed is:

1. A method for controlling dusting of material comprising the steps of:
applying an effective amount of a composition in the form of a liquid, the composition comprising an alkylphenol ethoxylate surfactant, a polyglycol, an anti-foaming agent and water to dust-producing material wherein the concentration of the surfactant is between about 10% and about 50% by volume, wherein the polyglycol is polyethylene glycol.

2. The method of claim 1, wherein the alkylphenol ethoxylate surfactant further comprises 2, 6, 8-trimethyl-4-nonyloxypolyethyleneoxyethanol.

3. The method of claim 1, wherein the anti-foaming agent is a polysiloxane polymer.

4. The method of claim 1, wherein the concentration of polyglycol is between about 0.1% and about 10% by volume.

5. The method of claim 1, wherein the concentration of anti-foaming agent is between about 0.1% and about 5% by volume.

6. The method of claim 1, wherein the composition further comprises one or more adjuvants.

7. The method of claim 1, wherein the composition is diluted between about 10 ppm and about 1000 ppm in water.

8. The method of claim 1, wherein the applying step further comprises the step of spraying droplets of the composition over a surface to coat and moisten the surface.

9. The method of claim 1 wherein the applying step further comprises the step of spraying the composition into the air as a mist to agglomerate airborne dust particles.

10. A method for controlling dusting of material comprising the step of applying an effective amount of a composition comprising an alkylphenol ethoxylate surfactant, glycerin, an anti-foaming agent, and water to a dust-producing material.

11. The method of claim 10, wherein the alkylphenol ethoxylate surfactant further comprises 2, 6, 8-trimethyl-4-nonyloxypolyethyleneoxyethanol.

12. The method of claim 10, wherein the anti-foaming agent is a polysiloxane polymer or emulsion thereof.

13. The method of claim 10, wherein the composition further comprises polyethylene glycol.

14. The method of claim 10, wherein the concentration of the surfactant is between about 10% and about 50% by volume.

15. The composition of claim 10, wherein the concentration of glycerin is between about 0.1% and 10% by volume.

* * * * *